United States Patent [19]
Faucher

[11] Patent Number: 5,127,785
[45] Date of Patent: Jul. 7, 1992

[54] HANGER NAIL FOR SUSPENDED CEILING

[76] Inventor: Raymond G. Faucher, 9470 Grondin Avenue, Charlesbourg, Quebec G1G 5L2, Canada

[21] Appl. No.: 661,230

[22] Filed: Feb. 27, 1991

[51] Int. Cl.⁵ .................. F16B 15/08; F16B 15/02
[52] U.S. Cl. ................... 411/453; 411/440; 411/485; 411/922
[58] Field of Search ........... 411/440, 441, 450, 451, 411/452, 453, 454, 456, 485, 923, 922, 447; 52/162, 163, 166; 135/118; 248/231.9, 231.91; 112/222, 224, 225

[56] References Cited

U.S. PATENT DOCUMENTS

| | | | |
|---|---|---|---|
| 345,153 | 7/1886 | Latchford | 411/452 |
| 838,203 | 12/1906 | Neil | 411/447 |
| 1,326,910 | 1/1920 | Butterfield | 411/453 |
| 1,876,021 | 9/1932 | Quigley | 411/453 |
| 2,490,355 | 12/1949 | Hubbard | 52/166 |
| 2,618,297 | 11/1952 | Gosselin | 411/922 |
| 2,712,864 | 7/1955 | Clevett, Jr. | 135/118 |
| 3,491,933 | 1/1970 | Thurner et al. | 411/441 |

Primary Examiner—Neill R. Wilson
Attorney, Agent, or Firm—Roland L. Morneau

[57] ABSTRACT

A nail is adapted to be inserted in a solid material with a wire hooked to the nail in such a way so that the wire is inserted with the nail into the solid material. The nail is crosswise perforated with grooves on each side of the nail to provide a tight pathway for the wire.

6 Claims, 2 Drawing Sheets

HANGER NAIL FOR SUSPENDED CEILING

FIELD OF THE INVENTION

This invention relates to suspended grid system for supporting ceiling tiles, and more particularly to a nail adapted to be inserted in a solid material of an overhead frame for securing a wire to which the grid system is attached.

BACKGROUND OF THE INVENTION

Suspended ceilings conventionally comprise a plurality of parallel, spaced main grid members which may include cross-grid members extending transversally between the main grid members and having end portions interlocking therewith.

Such grid members are generally suspended from a conventional ceiling or an overhead support structure framework by hanger wires. The grid members are adapted to support ceiling tiles or the like in a horizontal spaced relationship below the conventional ceiling. The hanger wires can be affixed to the conventional ceiling in a variety of ways, depending on the nature of such ceilings.

One of the most common methods of affixing the hanger wire to the conventional ceiling involves the use of a nail or a screw provided with an eyelet at the end opposite the tip. The nail or screw is first partially inserted in the conventional ceiling usually by a pneumatic means such as a pneumatic hammer with the eyelet substantially perpendicular and adjacently outside the surface of the ceiling. The upper end portion of the wire is then threaded through the eyelet and twisted around the downwardly extending portion, thus providing a knot which prevents the wire from slipping out of the eyelet.

Another common method for affixing the hanger wire to the conventional ceiling is illustrated in FIG. 1 of U.S. Pat. No. 4,084,364 granted to Mr. Donald P. Jones. This method consists in first twisting the upper end portion of the hanger wire referred to by numeral 20 in such a fashion that it forms an eyelet substantially parallel to the lower surface of the conventional ceiling 10. A nail is then inserted through such eyelet into the ceiling.

Both of these methods present similar major drawbacks. Indeed, both methods require some type of twisting operation on the part of the user. These twisting operations of the hanger wire are not only annoying but also time consuming. The twisting operations which must be performed manually also involve the possibility that the user cuts his finger on the relatively sharp edges at the extremity of the wire.

Another major drawback inherent to the previously described methods of affixing the hanger wire to the conventional ceiling is that the wire can untwist once an object is attached to its lower end. If it does untwist, the wire unavoidably will detach itself from the nail or screw which affixed it to the conventional ceiling. The resulting consequences could prove to be disastrous in instances where the suspended ceiling is located in occupied areas.

The present invention is adapted to circumvent the above mentioned disadvantages by providing a nail which eliminates the need for any twisting operation in order to secure the hanger wire to the conventional ceiling. The required time for installation of the suspended ceiling is therefore greatly reduced. The installation procedure is also now easier and more pleasant to perform.

Furthermore, the present invention also provides a more secure means of affixing the wire to the ceiling eliminating the possibility that a knot or eyelet formed integral with the wire by a twisting operation slips open when weight is applied to the lower end of such wire.

SUMMARY OF THE INVENTION

The present invention therefore relates to a nail which is adapted to hold a wire for use in suspending a framework for a suspended ceiling. The nail is characterized by a substantially cylindrical bullet-shaped body having a pointed tip at one of its ends and a substantially flat surface at the other end. It is also characterised by a pair of recesses portions or grooves which extend longitudinally on the periphery of the body from the flat surface to a section intermediate both ends. A perforation through the body extends from one of the recesses to the other recess. This perforation through the grooves is adapted to provide a pathway for the wire. The transversal section of the grooves is substantially semi-circular and its depth corresponds substantially to the diameter of the wire. The nail also includes a series of helicoidal peripheral threads which extend along the body. In an alternative embodiment of the invention, the recesses instead of being semi-circular is cross-section are defined by a pair of substantially flat walls.

BRIEF DESCRIPTION OF THE DRAWINGS

FIG. 2a is a longitudinal cross-sectional view of the alternative embodiment of the invention illustrated in FIG. 4a.

FIG. 4a is an elevational view of another embodiment of the invention,

DETAILED DESCRIPTION OF THE INVENTION

Figure 1:
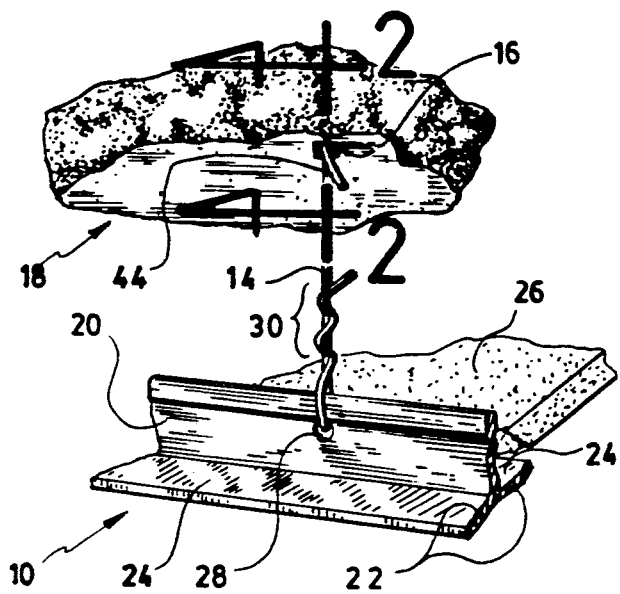
FIG. 1 is a perspective view of a cut-out portion of a grid member suspended by a wire to a nail forming the present invention, the nail being inserted in a cut-out portion of an overhead frame.
Figure 2:
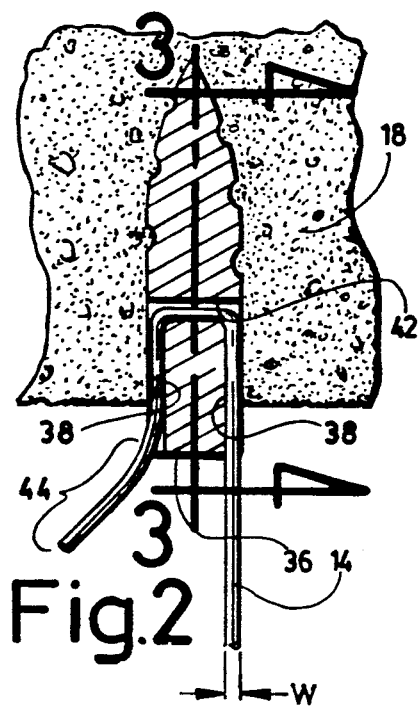
FIG. 2 is a detailed view taken along line 2—2 of FIG. 1 of the nail inserted in the overhead frame.

Referring more specifically to FIG. 1, a grid member 10 forming part of a grid network for a suspended ceiling is suspended by a hanger wire 14 to a nail 16 embodying the invention. The nail 16 is inserted in an overhead frame made of a solid material 18. The overhead frame 18 may be a wooden beam, a block of concrete or any one of a variety of superstructural members whereby a suspended ceiling is disposed in an horizontal plane in spaced relationship below such superstructural members. The grid member 10 includes an upstanding web means 20 and laterally extending flange means 22. The flange means 22 are adapted to support the edge portions 24 of a series of ceiling tiles 26. The hanger wire 14 is threaded through an aperture 28 in the upstanding web means 20 and tied into a twisted knot 30 so as to space the grid member 10 an appropriate distance below the overhead frame 18.

Figure 3:
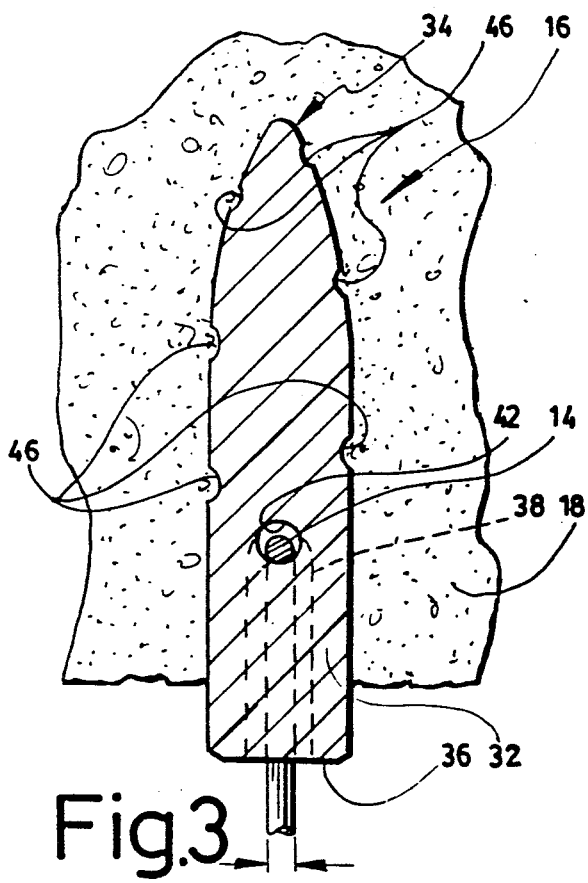
FIG. 3 is a cross-sectional view taken along line 3—3 of FIG. 2.
Figure 4:
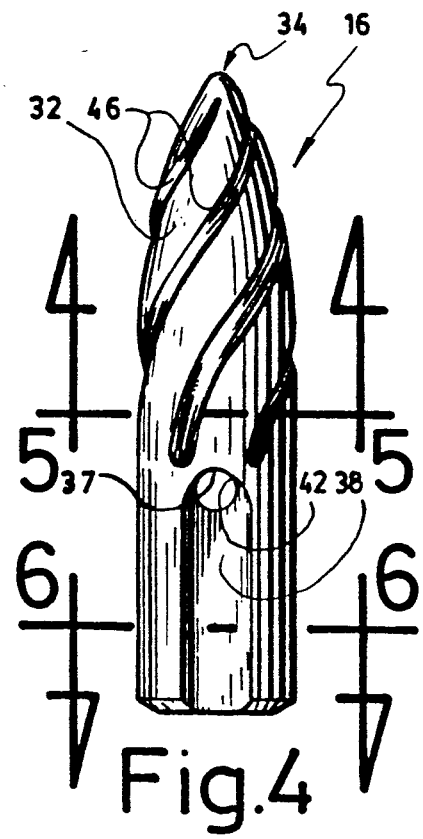
FIG. 4 is an elevational view of the nail.
Figures 5, 6:
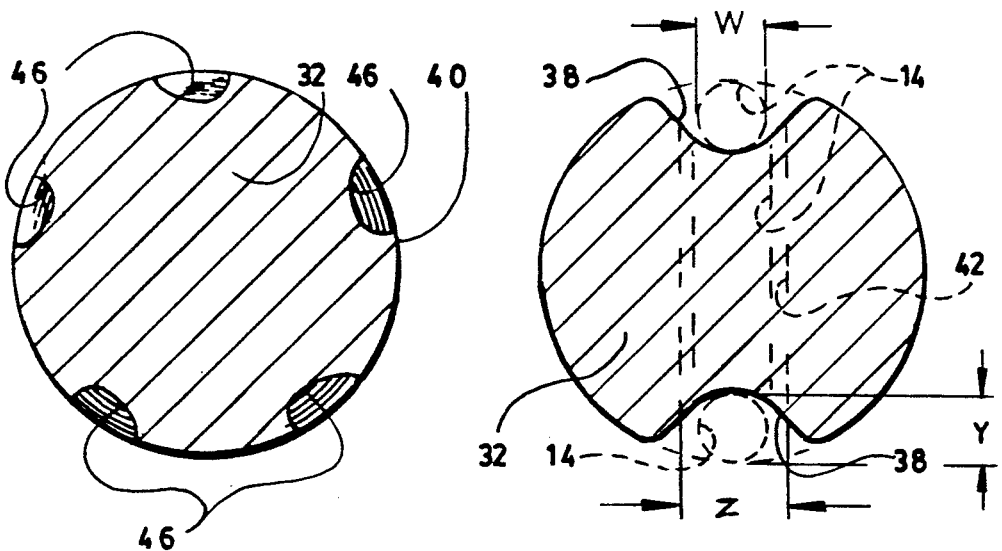
FIG. 5 is a cross-sectional view taken along line 55 of FIG. 4.
FIG. 6 is a cross-sectional view taken along line 66 of FIG. 4.
Figures 2A, 4A:
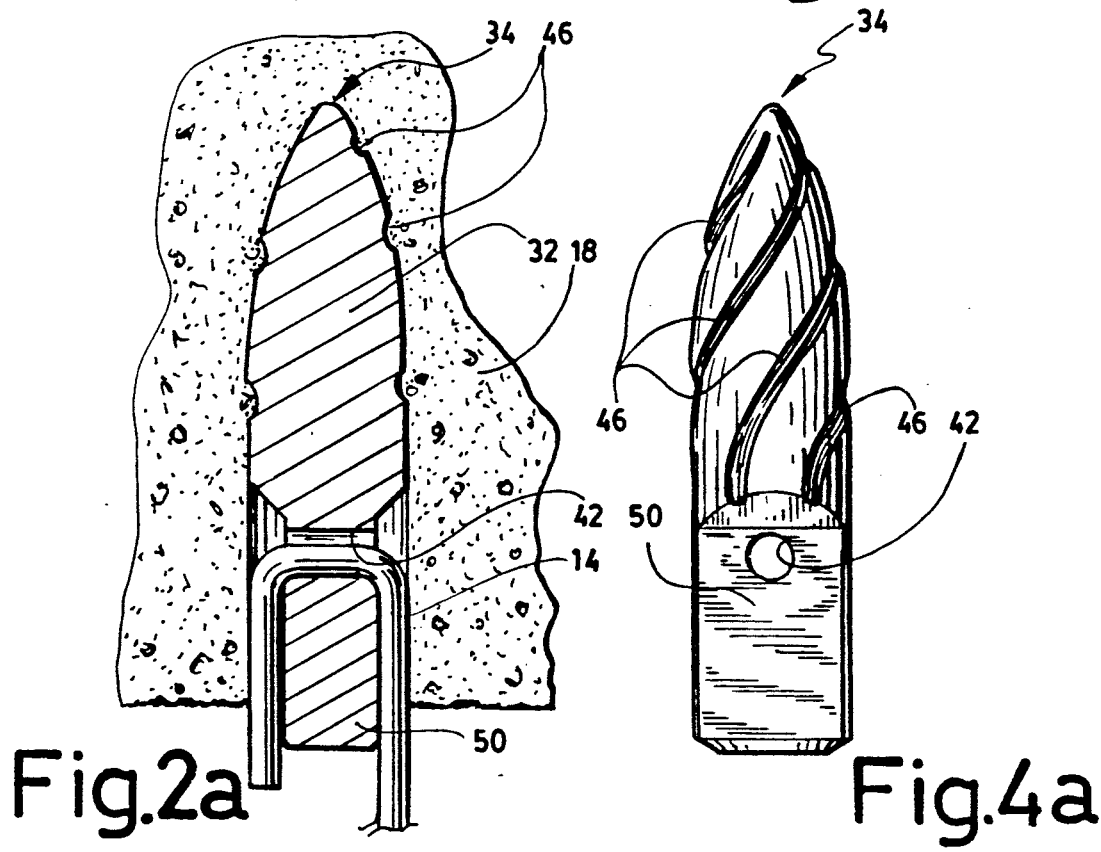

Referring now more specifically to FIG. 4, the nail 16 is characterized by a substantially cylindrical bullet-shaped body 32 having a pointed tip 34 at one end and a substantially flat surface 36 at the opposite end. A pair of grooves 38 having a substantially semi-cylindrical cross-section extended longitudinally on the periphery 40 of the body 32 from the flat surface 36 to a plane 37 approximately midway between the tip 34 and the flat surface 36. As shown in FIG. 6 the diameter Z of the perforation 42 is slightly greater than the diameter W of the hanger wire 14. The depth Y of the groove 38 is substantially equal to the diameter W of the hanger wire 14. As shown in FIG. 3 and 6 the perforation 42 and the groove 38 provide a pathway for the hanger wire 14.

In use, an upper end portion 44 of the hanger wire 14 is first threaded through the perforation 42 and pulled inside the groove 38 until it exceeds the flat surface 36. The nail 16 and part of the associated wire 14 inside recess 38 and perforation 42 are then driven simultaneously inside the overhead frame 18 by an impact imparted on the flat surface 36 by an appropriate tool such as a conventional hammer. The depth Y of the grooves 38 being slightly inferior ro the diameter W of the hanger wire 14, part of the outer periphery of the hanger wire 14 will come into frictionless contact with the material forming the overhead frame as it is inserted in the latter thus locking the wire in position. There are therefore no more needs for twisting the wire as was the case with previoys methods of securing the hanger wire to the overhead structure 18 since the hanger wire is squeezed inside the recess 38 and thus locked inside the overhead structure 18. The user of the present invention merely has to impact on the flat surface 36, a very fast and simple operation, to obtain a reliable means for securing the hanger wire 14 to the overhead structure 18.

The body 32 is provided with a plurality of helicoidal threads 46 adapted to allow the evacuation of the material during insertion in the overhead frame 18 and to increase friction between the nail 16 and the overhead frame 18.

When the nail 16 is intended to be inserted in a solid material such as concrete and the evacuation of the latter through the threads 46 is not expected to be sufficient, a hole is preferably drilled in the concrete prior to the insertion of the nail. The hole has a diameter which is slightly smaller than the diameter of the nail to assure a tight fit of the latter.

In another embodiment of the invention illustrated in FIGS. in 2a and 4a, the recesses are no longer semi-circular in cross-section as was the case with the groove 38 of the previous embodiment. The alternative recesses are defined by substantially flat walls 50 forming a partition integral with the body 32 of the nail 16. The hanger wire 14 is thus squeezed between the flat walls 50 and the surrounding frame 18. This embodiment can prove to be easier to manufacture.

In the preferred embodiment, the nail 16 is manufactured in a metallic material such as a steel alloy.

In another alternative embodiment, the nail 16 is manufactured in a polymeric material such as PVC. When a polymeric material is used, a hole is first drilled into the overhead structure 10 before the nail 16 is impact driven into the material to avoid rupture of the nail.

I claim:

1. A nail adapted to be inserted in a solid material and to hold a wire for use in suspending a framework for a suspended ceiling, said nail comprising a cylindrical body having a substantially uniform cross-section tapering into a pointed tip at one end and a substantially flat striking face at the other end, said body having a pair of opposed recesses longitudinally extending on the periphery of said body from said flat striking face to a cross-section intermediate both of said ends, a perforation through said body extending from one of said pair of recesses to the other recess, said recesses having a depth substantially corresponding to the diameter of the wire, said perforation and said recesses adapted to provide a tight pathway for said wire when said nail is inserted in said material up to a cross-section beyond said perforation.

2. A nail as recited in claim 1, wherein said recesses are characterized by two opposite flat walls forming a partition, said walls adapted to squeeze said wire when the nail is inserted in said material.

3. A nail as recited in claim 1, wherein each of said recesses is a groove which has a depth substantially corresponding to the diameter of said wire.

4. A nail as recited in claim 3, wherein said groove has a transversal section which is substantially semi-circular.

5. A nail as recited in claim 3, wherein said perforation extends across said body at a level corresponding to said intermediate section.

6. A nail as recited in claim 5, wherein said body has a helical peripheral thread between said intermediate section and said pointed tip.

* * * * *